United States Patent Office 3,439,243
Patented Apr. 15, 1969

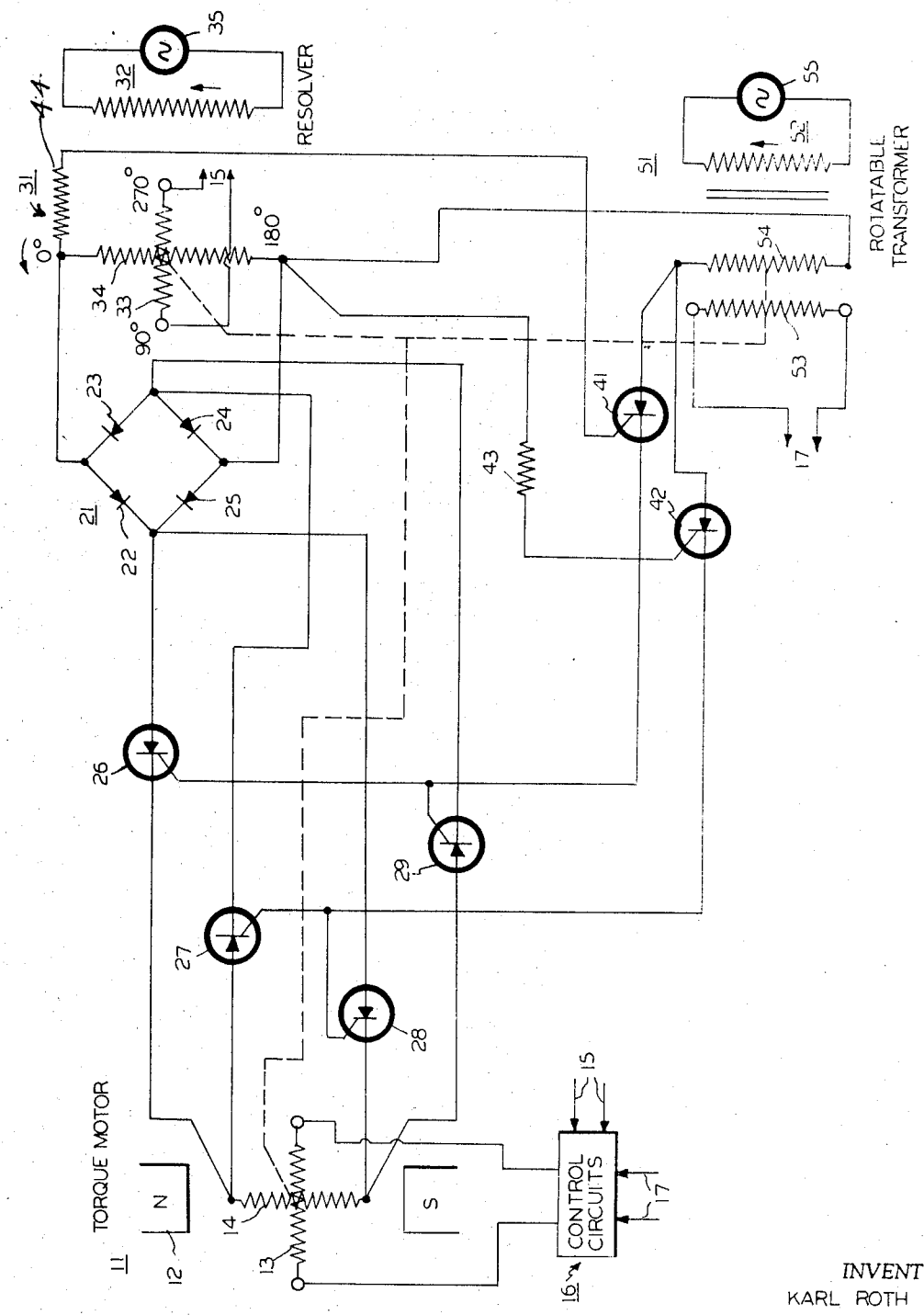

3,439,243
BRUSHLESS TORQUER
Karl Roth, Drexel Hill, Pa., assignor to Litton Precision Products, Inc., Clifton Heights, Pa., a corporation of Delaware
Filed Mar. 25, 1966, Ser. No. 537,389
Int. Cl. H02k 29/00; H02p 1/00, 2/00
U.S. Cl. 318—138                                     8 Claims The present invention relates generally to a torquer and more particularly to a brushless torquer.

Conventionally one type of A.C. torquer that has been manufactured utilizes a rotor having a pair of displaced windings arranged in such a manner that A.C. control signals supplied thereto have been in quadrature, i.e., the field produced in one winding being 90° displaced in space from that of the other winding. The stator of such a device is provided with a magnetic field, such that the rotor is subjected to a torque upon application of the control signals to the rotor resulting from the interaction of the magnetic field produced by the rotor field components and the field from the magnetic stator. Obviously, in such devices commutative action using brushes or the like is necessary to convey the A.C. control signal to the rotatable rotor.

The present invention eliminates the need for brushes or other types of commutating devices, in such a torquer by providing a resolver and rotating transformer in conjuction with control circuitry all of which are mounted on the same shaft as the torquer rotor whereby the control signal to the torquer rotor is conveyed thereto by well-known principles of induction. Some of the obvious advantages of such a brushless device are elimination of drag on the rotor, and the elimination of the need for constant adjustment and replacement of the moving commutative elements.

An object of the present invention is the provision of a brushless torquer.

A further object of the present invention is to provide a brushless torquer responsive to the amplitude of an A.C. control signal applied thereto.

Other objects and advantages of the invention will hereinafter become more fully apparent from the following description of the components and operation of the single figure of drawing taken in conjunction with the recitation in the appended claims.

The sole figure of drawing illustrates by schematic representation an embodiment of the invention.

Turning now to the drawing, there is shown a torque motor 11 having a permanent magnet stator 12 and a rotor comprising two windings in quadrature, a sine winding 13 and cosine winding 14. Mounted on the same shaft as this rotor is a resolver 31 and a rotatable transformer 51. The resolver 31 has a primary winding 32, and two secondary windings 33 and 34 in quadrature hereinafter referred to as sine and cosine windings. Similarly the rotatable transformer 51 has a primary winding 52 and two secondary windings 53 and 54.

The primary 32 of the resolver 31 and the primary winding 52 of the transformer 51 are energized by sources 35 and 55, respectively, with A.C. voltage of the same frequency which are locked in phase, one with the other, at for example, a frequency of 400 cycles per second.

The cosine winding 34 of the resolver is connected across the input terminals of a diode rectifier bridge 21 having rectifiers 22 to 25, poled as shown. One output terminal of the bridge is connected to one end of the cosine winding 14 of the torquer through a first silicon controlled rectifier (SCR) 26, and by means of a second SCR 28 to the opposite terminal. Further leads connect the other output of bridge 21 to the upper end of winding 14 through a third SCR 27 and to the lower terminal of winding 14 through a fourth SCR.

The gate terminals of SCR's 26 and 29 are connected to the cathode of a fifth SCR 41, and the gate terminal of SCR's 27 and 28 are connected to the cathode of a sixth SCR 42. The anode of each of the SCR's 41 and 42 is connected to one end of the secondary winding 54 of the rotatable transformer 51. The other end of this winding 54 is connected directly to the lower end of cosine winding 34 of the resolver. The gate terminal of SCR 42 is also connected through a resistor 43 to this lower end of winding 34, while the gate terminal of SCR 41 is connected through a resistor 44 to the other end of the winding 34.

Connections and circuit elements between the sine winding 13 of the torquer and the sine winding 33 of resolver 31 and the transformer secondary winding 53 are identical to that just described in conjuction with cosine windings 14 and 34 and secondary winding 53, and accordingly are illustrated by the block 16 labeled "control circuits."

In operation, the sources 35 and 55 are of the same frequency and phase, as mentioned above. When the winding 34 of resolver 31 is in the angular sector of from 270° to 90°, the phase of the voltages induced in winding 54 and the SCR 41 is fired thereby firing the SCR's 26 and 29. When the SCR's 26 and 29 are fired, the A.C. voltage from winding 34 is full wave rectified by rectifier bridge 21 to pass a pulsating D.C. current through SCR 26, rotor winding 14, SCR 29 back to bridge 21 and winding 34 thereby creating a D.C. magnetic field, in winding 14 to electromagnetically react with the permanent magnet stator 12. In a similar manner, the voltage induced in sine winding 33 is rectified by the same control circuits, shown within block 16, to apply a D.C. current to the torquer winding 13, and the resultant direction of field produced in torquer windings 13 and 14 reacts with the permanent magnet stator 12 to rotate the rotor of the torquer. However as the rotor of torquer 11 turns it rotates the resolver 31 and the relative amplitude of the voltages induced in resolver windings 33 and 34 vary with one increasing and the other decreasing to correspondingly change the direction of the D.C. field produced in the rotor of torquer 11 to continue the rotation of the torquer. This action continues so long as a voltage of the same phase is induced in resolver winding 34. As the resolver winding 34 is rotated to its 90° position, the induced voltage therein is reduced to zero to extinguish the SCR's 26 and 29, and the similiar rectifiers in control circuit 16 are extinguished to de-energize torquer winding 13. However the rotative inertia of the torquer rotor normally carriers it past this angle, and after reaching about 95° position, the reversal in phase of the A.C. voltage induced in resolver winding 34 triggers the SCR 42 into conduction thereby firing the SCR's 27 and 28. These rectifiers are reversely poled from the rectifiers 26 and 29 and therefore apply the pulsating D.C. from the rectifier bridge 21 to torquer winding 14 in the opposite direction. Since the torquer winding 14 is also rotatively positioned in the angular sector of 90° to 270°, this reversal of polarity continues the application of torque in the motor in the same direction as before to continue the rotation of the torque motor. This action continues with the SCR's 41 and 42 being alternatively switched on and off to reverse the direction of current to the torquer windings as it rotates, thereby to continually energize the motor to rotate so long as a voltage is applied at source 35. For increasing the motor speed, the voltage of source 35 is increased to increase the magnitude of the D.C. field produced in the rotor windings; and to decrease or stop the motor, the voltage of source 35 is reduced to decrease the magnitude of the D.C. motor field to reach the desired speed, or to a level insufficient to sustain rotation. It is believed evident that the direction of rotation of the motor can be changed by reversing the polarity of the windings of either the resolver or the transformer.

It should be noted that the reason that the SCR's 41 and 42 are alternatively fired is that the fact that the phase of the voltage in the secondary transformer winding 54 does not vary with respect to its primary winding 52 as the secondary winding is rotated. On the other hand, the phase of resolver winding 34 reverses each half cycle of revolution. Therefore for one half cycle of revolution of the rotor, the relative phase of windings 54 and 34 is correct to fire only the SCR 41, and for the other half cycle of revolution is correct to fire only the SCR 42. Thus as the rotor traverses one half cycle of revolution, the SCR 41 is gated by the resolver to be repetitively fired for each half cycle of source 55 and, in turn, operates to repetitively fire the SCR's 26 and 29 to provide pulsing D.C. to torquer winding 14. As the rotor traverses the other half cycle of revolution, the SCR 42 is repetitively fired and in turn fires SCR's 27 and 28 to provide pulsating D.C. current to torquer winding 14 in the opposite direction as desired. The identical control circuit 16 provides the same function for the other torquer winding 13 whereby the net pulsating magnet field produced by windings 13 and 14 is continually angularly displaced from the stator field to provide the turning torque for rotating the motor rotor.

The total torque produced in the rotor of the torque motor 11, is equal to the sum of the torques produced by the sine winding 13 and by the cosine winding 14:

$$T_{total} = T_1 \text{ and } T_2$$

where:

$$T_1 = K_1 \phi I \sin \theta \text{ and}$$
$$T_2 = K_1 \phi I \cos \theta$$

where $K_1$ is a constant and $\phi$ is the flux linking the armature windings 13 and 14. Since the flux $\phi$ varies sinusoidally, the total torque may be expressed as:

$$T_{tot} = K_2 I \sin^2 \theta + K_2 I \cos^2 \theta$$
$$= K_2 I (\sin^2 \theta + \cos^2 \theta)$$

since:

$$\sin^2 \theta + \cos^2 \theta = 1$$
$$T_{total} = K_2 I$$

Thus, the speed of rotation of the device may be varied merely by varying the amplitude (I) supplied by the A.C. voltage of source 35. Obviously, the direction of rotation may be changed by reversing the polarity of either the resolver 31 or the transformer 51.

Thus a brushless torquer has been described which provides for all of the advantages of the prior art A.C. torquers yet possess none of the disadvantages inherent with the use of brushes or other types of commutating devices.

Various modifications are contemplated and may be resorted to by those skilled in the art without departing from the spirit and scope of the invention. Therefore the present invention should be considered as limited only by the following claims.

What is claimed and desired to be secured by Letters Patent of the United States is:

1. A brushless torquer comprising: a stator and first plurality of windings mounted upon a shaft in force reactive relationship with said stator, a first rotary inductive means having a second plurality of windings mounted upon said shaft angularly movable with respect to and in inductive relationship with a stator winding, switching means interconnecting said first and second plurality of windings for transmitting signals from said second to said first plurality of windings, and second rotary inductive means having a winding on said shaft angularly movable with respect to and inductive relationship with a second stator winding for controlling the switching means.

2. The device of claim 1 wherein said stator includes a permanent magnet the field of which is coupled to said first plurality of windings and wherein said first inductive means has at least a pair of coils one of which is sensitive to rotation of said shaft through a first angle and the other of which is sensitive to rotation through a second angle.

3. The device of claim 2 wherein said second rotary means is a rotatable transformer.

4. The device of claim 1 wherein said second rotary inductive means controls said switching means in response to the angular position of said shaft.

5. The device of claim 4 wherein said second rotary means is a rotatable transformer.

6. The device of claim 1 wherein said stator includes a permanent magnet the field of which is coupled to said first plurality of windings and said switching means include means for rectifying the induced signals.

7. The device of claim 6 wherein said switching means further includes a plurality of rectifier devices selectively gated by said second rotary means.

8. A brushless torquer comprising a torque motor having a rotor including a pair of windings mounted in quadrature, a resolver having a fixed primary winding and a pair of rotating secondary windings mounted in quadrature and on the same shaft as said torque motor windings, a rotatable transformer having a fixed primary winding and a pair of rotating secondary windings mounted on the same shaft as said previously mentioned rotating windings, two rectifier bridges each connected between one each of said resolver and torque motor windings respectively, and mounted on said shaft, switching means connected between each of said bridges and said winding and gating means connected between said switching means and said transformer secondaries and mounted for rotation upon said shaft.

References Cited

UNITED STATES PATENTS

| | | | |
|---|---|---|---|
| 2,424,843 | 7/1947 | Owsley | 318—23.5 |
| 2,669,678 | 2/1954 | Pfuntner | 318—23.5 |
| 3,327,185 | 6/1967 | Kiwada | 318—23.5 |

ORIS L. RADER, *Primary Examiner.*

G. SIMMONS, *Assistant Examiner.*

U.S. Cl. X.R.

318—23.5, 254